(12) United States Patent
Kaneko et al.

(10) Patent No.: US 10,740,908 B2
(45) Date of Patent: Aug. 11, 2020

(54) MOVING OBJECT

(71) Applicant: Hitachi, Ltd., Chiyoda-ku, Tokyo (JP)

(72) Inventors: Alex Masuo Kaneko, Tokyo (JP); Kenjiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 16/079,372

(22) PCT Filed: Jan. 12, 2017

(86) PCT No.: PCT/JP2017/000694
§ 371 (c)(1),
(2) Date: Aug. 23, 2018

(87) PCT Pub. No.: WO2017/145541
PCT Pub. Date: Aug. 31, 2017

(65) Prior Publication Data
US 2019/0066312 A1 Feb. 28, 2019

(30) Foreign Application Priority Data

Feb. 23, 2016 (JP) .................................. 2016/031570

(51) Int. Cl.
*G06T 7/246* (2017.01)
*G01B 11/00* (2006.01)
(Continued)

(52) U.S. Cl.
CPC .............. *G06T 7/248* (2017.01); *G01B 11/00* (2013.01); *G01B 11/02* (2013.01); *G01P 3/36* (2013.01);
(Continued)

(58) Field of Classification Search
None
See application file for complete search history.

(56) References Cited

U.S. PATENT DOCUMENTS 9,070,191 B2 6/2015 Murashita
9,996,981 B1 * 6/2018 Tran .................... G06K 9/2018
(Continued)

FOREIGN PATENT DOCUMENTS

| JP | 10-222665 A | 8/1998 |
| JP | 2003-178309 A | 6/2003 |
| JP | 2013-3110 A | 1/2013 |

OTHER PUBLICATIONS

JP 2013003110 translation computer generated ; Takada S (Year: 2011).*
(Continued)

*Primary Examiner* — Nancy Bitar
(74) *Attorney, Agent, or Firm* — Crowell & Moring LLP (57) ABSTRACT

An object of the invention is to provide a moving object capable of being calculated a movement amount with a low processing load and high accuracy even when a three-dimensional object which is stationary or moves appears in a camera image. The invention is directed to a moving object which includes an imaging device which captures an image of a road surface and an image processing unit which calculates a movement amount of the moving object based on an image captured by the imaging device, wherein the image processing unit extracts a plurality of first feature points from a first image captured at a first timing, extracts a plurality of second feature points from a second image captured at a second timing after the first timing, performs tracking on each of the plurality of first feature points to each of the plurality of second feature points, calculates a movement amount and a speed of each of the plurality of second feature points, and calculates a movement amount of the moving object based on a feature point having a speed within a predetermined range among the plurality of second feature points.

4 Claims, 5 Drawing Sheets

(51) Int. Cl.
    *G01B 11/02*     (2006.01)
    *G01P 3/36*     (2006.01)
    *G06T 7/20*     (2017.01)
    *G08G 1/16*     (2006.01)
    *G06K 9/00*     (2006.01)
    *G06K 9/32*     (2006.01)

(52) U.S. Cl.
    CPC ..... *G06K 9/00201* (2013.01); *G06K 9/00791* (2013.01); *G06K 9/3233* (2013.01); *G06T 7/20* (2013.01); *G06T 7/246* (2017.01); *G08G 1/16* (2013.01); *G06T 2207/10016* (2013.01); *G06T 2207/20164* (2013.01); *G06T 2207/30252* (2013.01)

(56) References Cited

U.S. PATENT DOCUMENTS

| | | | | |
|---|---|---|---|---|
| 10,282,914 | B1* | 5/2019 | Tran | A61B 5/6898 |
| 2008/0095402 | A1* | 4/2008 | Kochi | G06T 7/248 |
| | | | | 382/103 |
| 2010/0104199 | A1 | 4/2010 | Zhang et al. | |
| 2016/0267657 | A1* | 9/2016 | Gupta | H04N 17/00 |
| 2017/0151943 | A1* | 6/2017 | Goto | B60W 10/20 |
| 2017/0294123 | A1* | 10/2017 | Baba | B60R 21/00 |
| 2017/0300780 | A1* | 10/2017 | Baba | G06K 9/00805 |

OTHER PUBLICATIONS

Extended European Search Report issued in European Application No. 17755983.8 dated Sep. 18, 2019 (10 pages).

Giachetti et al., "The Recovery of Optical Flow for Intelligent Cruise Control," Oct. 24, 1994, pp. 91-96, XP010258311 (six (6) pages).

Japanese-language Office Action issued in counterpart Japanese Application No. 2018-501027 dated Oct. 8, 2019 with English translation (five (5) pages).

International Search Report (PCT/ISA/210) issued in PCT Application No. PCT/JP2017/00694 dated Apr. 18, 2017 with English translation (two (2) pages).

Japanese-language Written Opinion (PCT/ISA/237) issued in PCT Application No. PCT/JP2017/00694 dated Apr. 18, 2017 (four (4) pages).

* cited by examiner

MOVING OBJECT

TECHNICAL FIELD

The present invention relates to a moving object such as a robot and an automobile.

BACKGROUND ART

In order to improve safety and convenience in a moving object such as a robot and an automobile, autonomous driving technologies and driving support technologies which detect information on the surrounding environment and perform travelling control according to a situation have been developed.

As an example of calculating a movement amount of the moving object, there is a technique of calculating a displacement vector ΔS representing a movement amount at a predetermined minute time interval Δt based on a camera image captured with a camera of the moving object (see PTL 1). In the document, in order to calculate the vector ΔS, feature points in a roadway are extracted as much as possible and an average value of movement amounts of respective feature points is taken as the movement amount of the moving object.

CITATION LIST

Patent Literature

PTL 1: JP-A-2003-178309

SUMMARY OF INVENTION

Technical Problem

However, as in PTL 1, even when the average value of the movement amounts of a plurality of feature points is taken, it is not ensured that accuracy can always be enhanced. For example, when a three-dimensional object is shown in more than half of a camera image, tracking failure of a feature point or erroneous calculating of movement amounts of the moving object may occur due to an influence of the height and the movement amount of the three-dimensional object.

An object of the invention is to provide a moving object capable of being calculated a movement amount with a low processing load and high accuracy even when a three-dimensional object which is stationary or moves appears in a camera image.

Solution to Problem

In order to solve the problem described above, a representative moving object of the invention includes an imaging device which captures an image of a road surface and an image processing unit which calculates a movement amount of the moving object based on an image captured by the imaging device, wherein the image processing unit extracts a plurality of first feature points from a first image captured at a first timing, extracts a plurality of second feature points from a second image captured at a second timing after the first timing, performs tracking on each of the plurality of first feature points to each of the plurality of second feature points, calculates a movement amount and a speed of each of the plurality of second feature points, and calculates a movement amount of the moving object based on a feature point having a speed within a predetermined range among the plurality of second feature points.

Advantageous Effects of Invention

According to the invention, it is possible to provide a moving object capable of being calculated a movement amount with a low processing load and high accuracy even when a three-dimensional object which is stationary or moves appears in a camera image.

DESCRIPTION OF EMBODIMENTS

Figure 1:
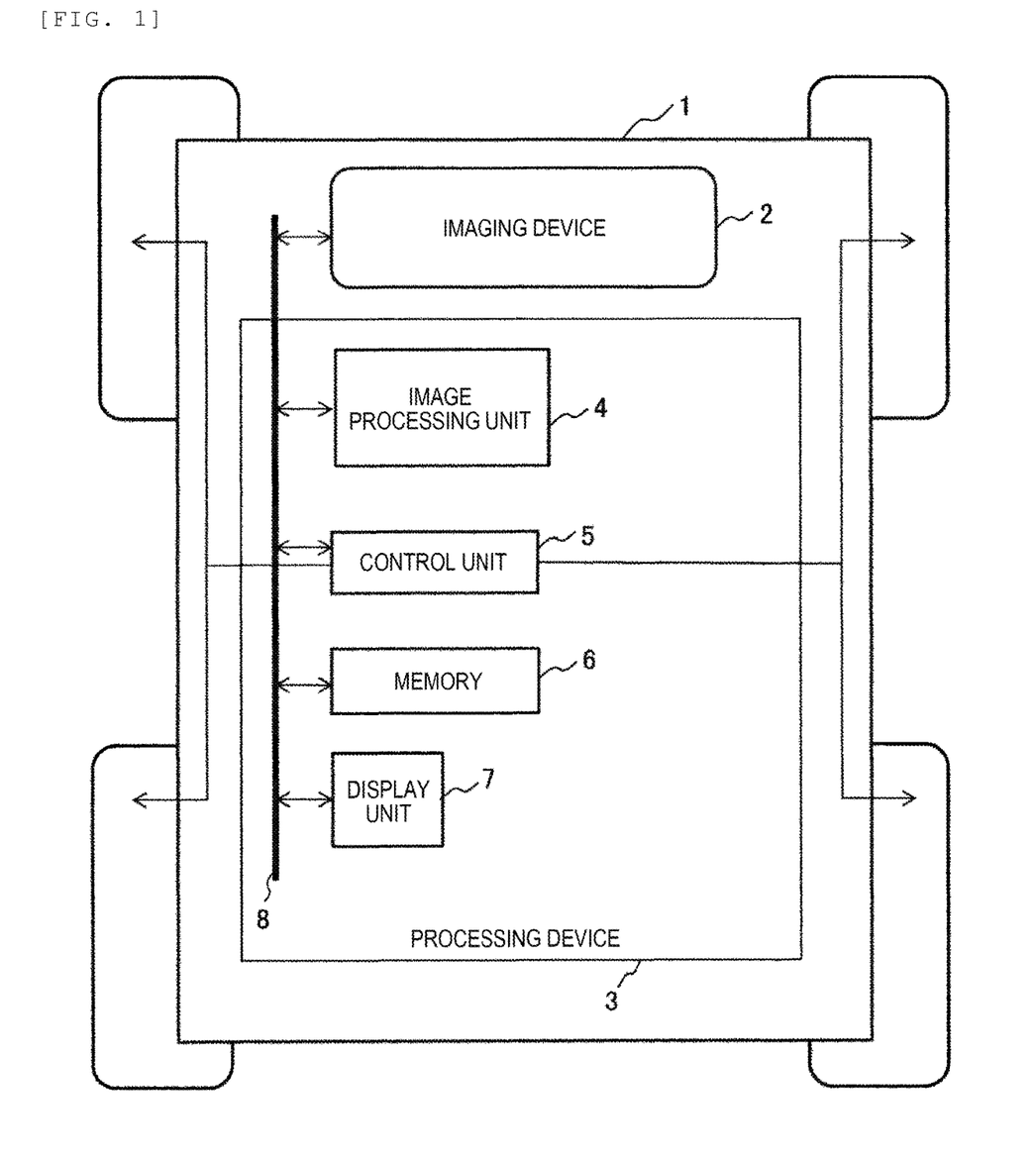
FIG. 1 is a configuration diagram of a moving object.

Hereinafter, an example will be described with reference to drawings. FIG. 1 is a configuration diagram of a moving object.

A moving object 1 is constituted of an imaging device 2 which captures an image of a surrounding environment and a processing device 3 which processes the image captured by the imaging device 2 to calculate a movement amount of the moving object 1 and outputs a display or a control signal according to a calculation result.

The processing device 3 is constituted of a computer system or the like and includes an image processing unit 4 for processing the image captured by the imaging device 2, a control unit (CPU) 5 for performing various controls based on the processed image, a memory 6 for storing various data used in the control unit for movement amount calculation, and the like, a display unit 7 for outputting the calculation result and the like of control unit 5, and a bus 8 for interconnecting these constituent elements.

The imaging device 2 is, for example, a monocular camera or a stereo camera installed facing the front of the moving object 1. When the imaging device 2 is a monocular camera, if the road surface is flat, a pixel position on the image and an actual positional relationship (x,y) become constant, and thus feature points can be calculated geometrically. When the imaging device 2 is a stereo camera, a distance to the feature point can be measured more accurately. In the following description, for simplicity of explanation, a case where one standard camera is adopted will be described. However, as long as the feature point has a viewing angle which can be extracted during traveling, it may be a standard camera, a wide angle camera, or a stereo camera. Any types of cameras ultimately generate one image and a plurality of cameras may be combined to constitute the imaging device 2.

The imaging device 2 acquires an image at the time when a command is input from the control unit 5 or at a predetermined time interval and outputs the acquired image and the acquisition time to the image processing unit 4 via the memory 6. An original image of the acquired image and the acquisition time are stored in the memory 6 and an intermediate processed image is created in the image processing unit 4. These intermediate images are also appropriately stored in the memory 6 as necessary, and used for determination and processing of the control unit 5 or the like.

Further, result data and the like used for processing in control unit 5 are also stored in memory 6 as appropriate.

A bus 8 for transmitting data between the blocks can be constituted of an InterEquipment Bus (IEBUS), a Local Interconnect Network (LIN), a Controller Area Network (CAN), or the like.

The image processing unit 4 calculates the movement amount based on the captured image acquired by the imaging device 2 while the moving object 1 travels. First, the feature point on the image transmitted from the imaging device 2 is extracted. Furthermore, feature points on a succeeding transmitted image are also extracted. Then, tracking (process of associating feature points with each other: see FIG. 4) is performed on the feature points extracted previously (last time) and the feature points extracted succeedingly (this time), in such a manner that the movement amount of the moving object is calculated and the result is output to the control unit 5.

The control unit 5 calculates the position of the moving object 1 based on the movement amount calculated by the image processing unit 4, and then the control unit 5 determines the future moving direction and speed and controls the moving object 1. Next, by displaying necessary detection results on the display unit 7, information is provided to an operator of the moving object 1.

Figure 2:
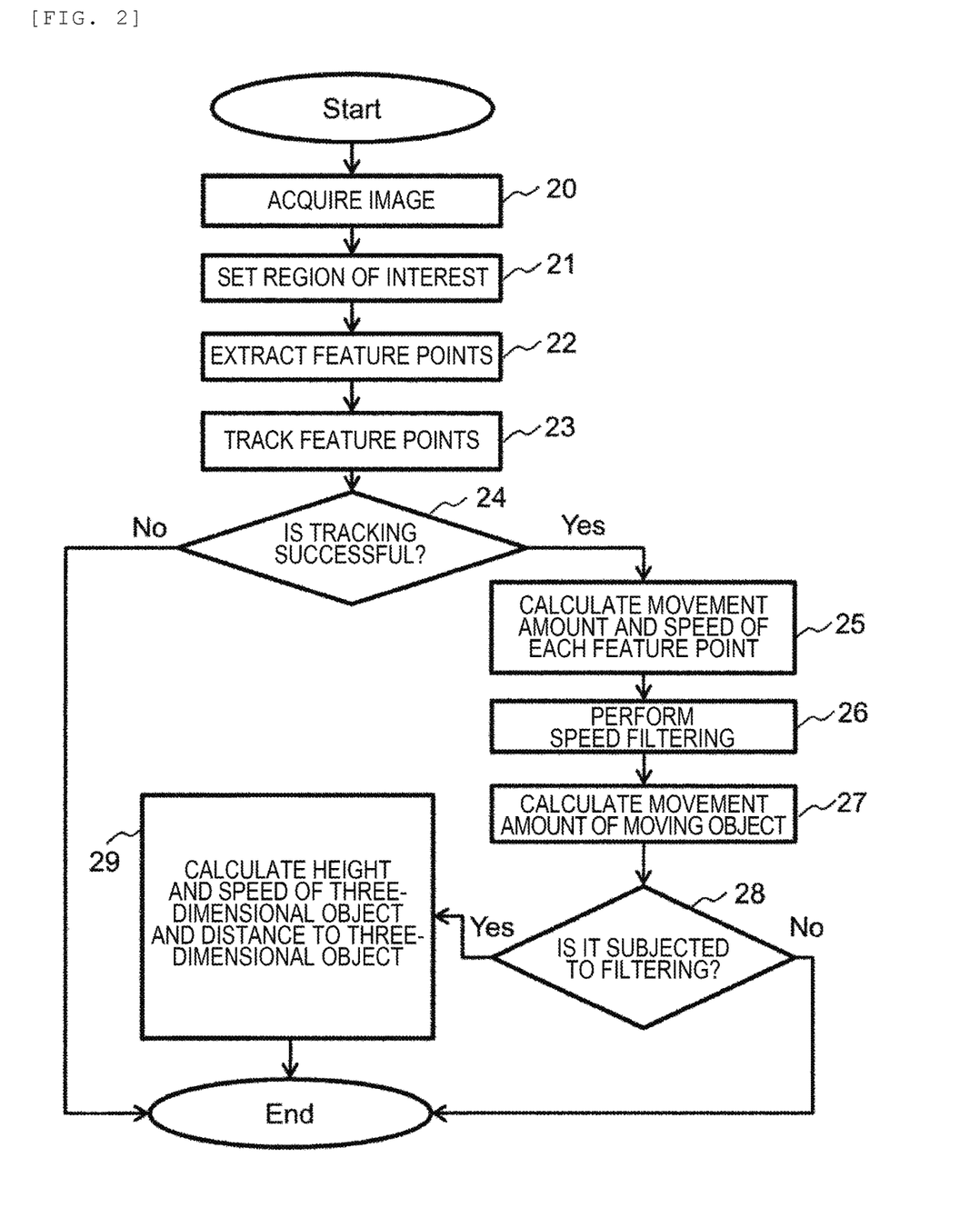
FIG. 2 is a flowchart of an image processing unit.

FIG. 2 is a view illustrating a flowchart of the image processing unit 4.

The image processing unit 4 acquires an image captured by the imaging device 2 from the memory 6 (Step 20).

Next, a region of interest for extracting feature points is set on the image acquired in Step 20 (Step 21). For example, in the case of a monocular camera, a traveling road surface geometrically capable of being precisely converted from a pixel position of an image to a meter position of a road surface is set as a region of interest.

Next, the feature points are extracted from the region of interest set in Step 21 (Step 22). The feature points are edges or corners on the image and uses technologies such as Canny, Sobel, FAST, Hessian, and Gaussian.

Next, the feature point extracted from an image (previous frame) captured at a first timing, that is, the feature point extracted from an image captured preceding the image (current frame) captured at a second timing, is subjected to tracking on an image captured this time (Step 23). For tracking, techniques such as Lucas-Kanade method and Shi-Tomasi method are used.

Next, it is checked whether the tracking in Step 23 is successful or not (Step 24). When the tracking is successful, the process proceeds to Step 25, and when the tracking fails, the process ends. Two images captured in different frames are required for tracking, and thus tracking cannot be performed for a first single image captured with starting-up of the moving object 1 in Step 23. Therefore, after Step 24 is performed, the process is finished.

When the tracking is successful, the movement amount and the speed of each tracked feature point are calculated (Step 25). For example, the number of feature points which can be tracked is set to n and the number of times to calculate the movement amount of the moving object 1 is set to m. The movement amount of each feature point 1, . . . , n is a difference ($\Delta d_{mn} = d_{mn} - d_{(m-1)n}$) between a relative position $d_{(m-1)n}$ of the feature point extracted in the previous frame and a relative position $d_{mn}$ of the feature point extracted this time. A relative speed $v_{mn} = \Delta d_{mn}/\Delta t_m$ of each feature point is calculated using a difference $\Delta t_m$ between an acquisition time of the previous frame and a current imaging time.

Next, the relative speed $v_{mn}$ of each feature point calculated in the Step 25 is compared with the speed $V_m$ of the moving object 1 stored in time series and a feature point of which the difference between the speed of the moving object 1 stored in time series and the relative speed $v_{mn}$ is larger than a predetermined value is subjected to filtering (removing) (Step 26).

Next, using the feature points not filtered in Step 26, the movement amount $\Delta D_m$ of the moving object 1 is calculated (Step 27). The number of the unfiltered feature point is set to o and a difference ($\Delta d_{mo} = d_{mo} - d_{(m-1)o}$) between a relative position $d_{(m-1)o}$ of the feature point extracted in the previous frame and a relative position $d_{mo}$ of the feature point extracted this time is calculated, and then a movement amount $\Delta D_m$ of the moving object 1 is calculated using a plurality of $\Delta d_{mo}$. As a method of calculating, for example, Rigid Body Transformation, Sliding Window, least squares method, median filter and the like can be used.

Next, it is checked whether there is a feature point filtered in Step 26 (Step 28). When there is a filtered feature point, the process proceeds to Step 29, and when there is no filtered feature point, the process is finished.

When there is a filtered feature point, the height of a three-dimensional object, the distance to the three-dimensional object, and the speed of the three-dimensional object are calculated using each feature point filtered in Step 26 and the movement amount $\Delta D_m$ of the moving object 1 calculated in Step 27 (Step 29).

Figure 3A:
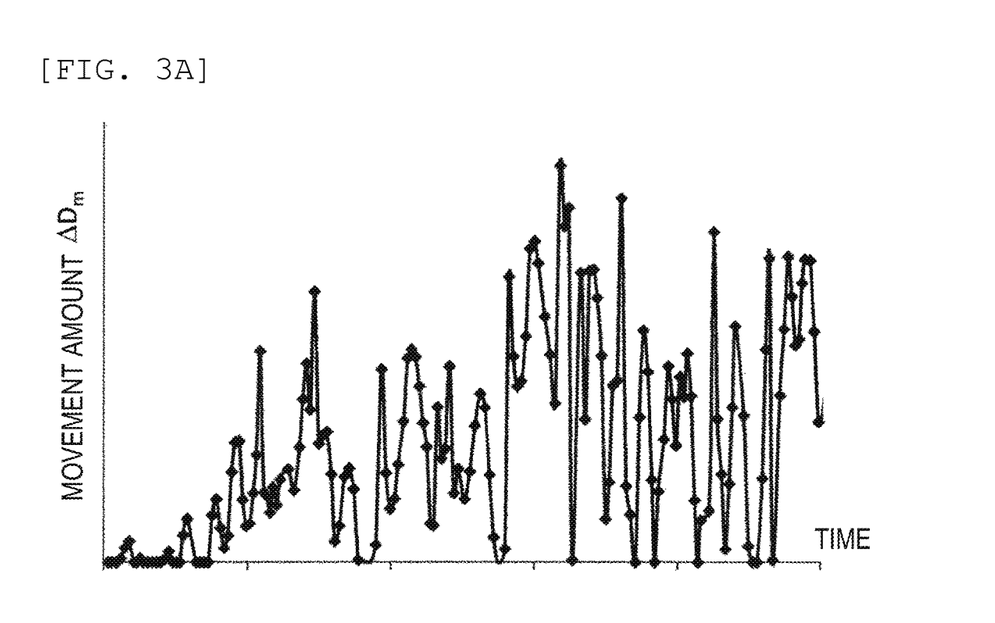
FIGS. 3A and 3B are detailed views of speed filtering.
Figure 3B:
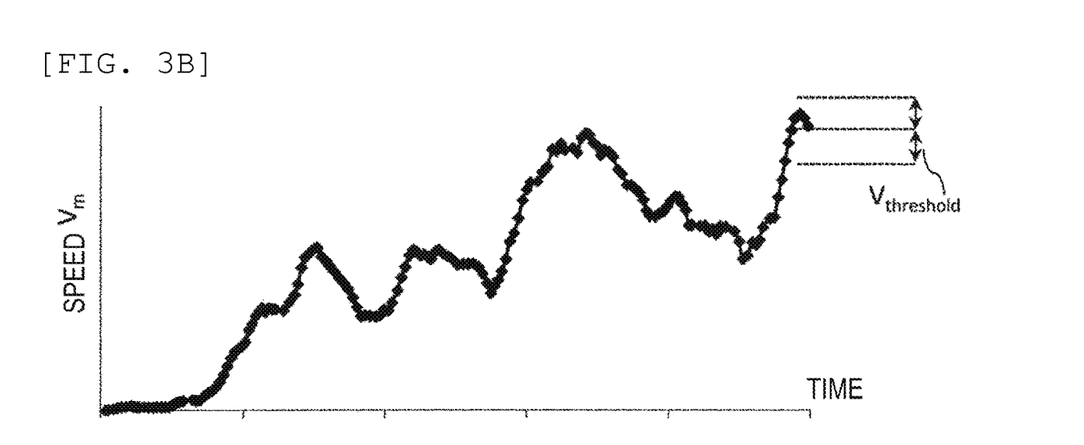

FIG. 3 is a detailed view of speed filtering in Step 26.

FIG. 3(A) illustrates a temporal transition of the movement amount $\Delta D_m$ of the moving object 1 calculated in Step 27. The processing time for calculating the movement amount differs depending on the number of feature points extracted in each frame, and thus the difference $\Delta t_m$ in the imaging time between frames irregularly fluctuates and the movement amount $\Delta D_m$ calculated during the difference $\Delta t_m$ irregularly changes. Therefore, there is no correlation between the movement amount calculated this time and the movement amount calculated in the previous frame.

FIG. 3(B) illustrates the speed $V_m$ of the moving object 1 calculated in Step 25. The number of data and the difference $\Delta t_m$ described in FIG. 3B are the same as those in FIG. 3(A). However, by dividing the irregularly changing movement amount $\Delta D_m$ by $\Delta t_m$, it can be converted into a regularly changing speed $V_m$. Physically, the speed does not change much in a short time (in millisecond units), and thus when $V_{m-1}$ is known, $V_m$ is within a threshold $V_{threshold}$ centered on $V_{m-1}$. Therefore, in Step 26, by comparing the relative speed $v_{mn}$ of each feature point calculated in Step 25 and the past moving object speeds $V_{m-1}$, $V_{m-2}$ . . . stored in time series, the filtering of the feature point can be performed.

When, for example, a condition of $|V_{m-1} - v_{mn}| > V_{threshold}$ is set, a feature point having a large difference between the speed of the moving object 1 calculated in the previous frame and the relative speed $v_{mn}$ is filtered. A speed $V_e = f(V_{m-1}, V_{m-2}, V_{m-3} \ldots)$ which is closer to the current speed is calculated based on not only the speed $V_{m-1}$ of the moving object 1 calculated in the previous frame but also the time series information of the speed calculated in the past and a condition $|V_e - V_{mn}| > V_{threshold}$ is set, in such a manner that filtering in Step 26 can be performed more accurately. The function f for calculating the current speed of the moving object 1 can be composed of a polynomial for interpolating the average of the time series information ($V_{m-1}$, $V_{m-2}$, $V_{m-3} \ldots$) of the speed of the moving object calculated in the past and the current speed.

Further, $V_{threshold}$ is not a constant value and may be calculated by the function $V_{threshold}=F(V_{m-1}, V_{m-2}, V_{m-3} \ldots)$. That is, $V_{threshold}$ may be varied based on the time series information of the speed of the moving object 1 calculated in the past. For example, it is possible to perform filtering statistically by calculating a standard deviation $\sigma$ of $V_e$ calculated based on the time series information on the past speed and setting $V_{threshold}=\sigma_m*k(0 \le k \le 3)$. This parameter k can be changed appropriately according to the surrounding environment and the state of the moving object 1.

Also, since there is no past speed information of the past moving object 1 after a movement amount calculation device is activated, most of the extracted feature points are used to calculate the current speed. That is, the initial value of the speed $V_e$ is set to 0 and the $V_{threshold}$ is set to be large.

Further, the speed filtering of Step 26 may be configured not only by the imaging device 2 but also by another speed sensor mounted on the moving object 1. For example, when a GPS capable of calculating a current position $GPS\_pos_m$ and a time GPS $t_m$ is installed, a speed $GPS\_V_m=(GPS\_pos_m-GPS\_pos_{m-1})/GPS\ t_m$ of the moving object 1 may be calculated and a speed $V_e$ may be calculated by $V_e=f(GPS\_V_{m-1}, GPS\_V_{m-2}, GPS\_V_{m-3} \ldots)$. $V_e=f(Sensor\_V_{m-1}, Sensor\_V_{m-2}, Sensor\_V_{m-3} \ldots)$ may be calculated based on a speed $Sensor\_V_m$ of the moving object 1 calculated by a speed sensor such as a wheel encoder, a radar, or a laser.

Figure 4:
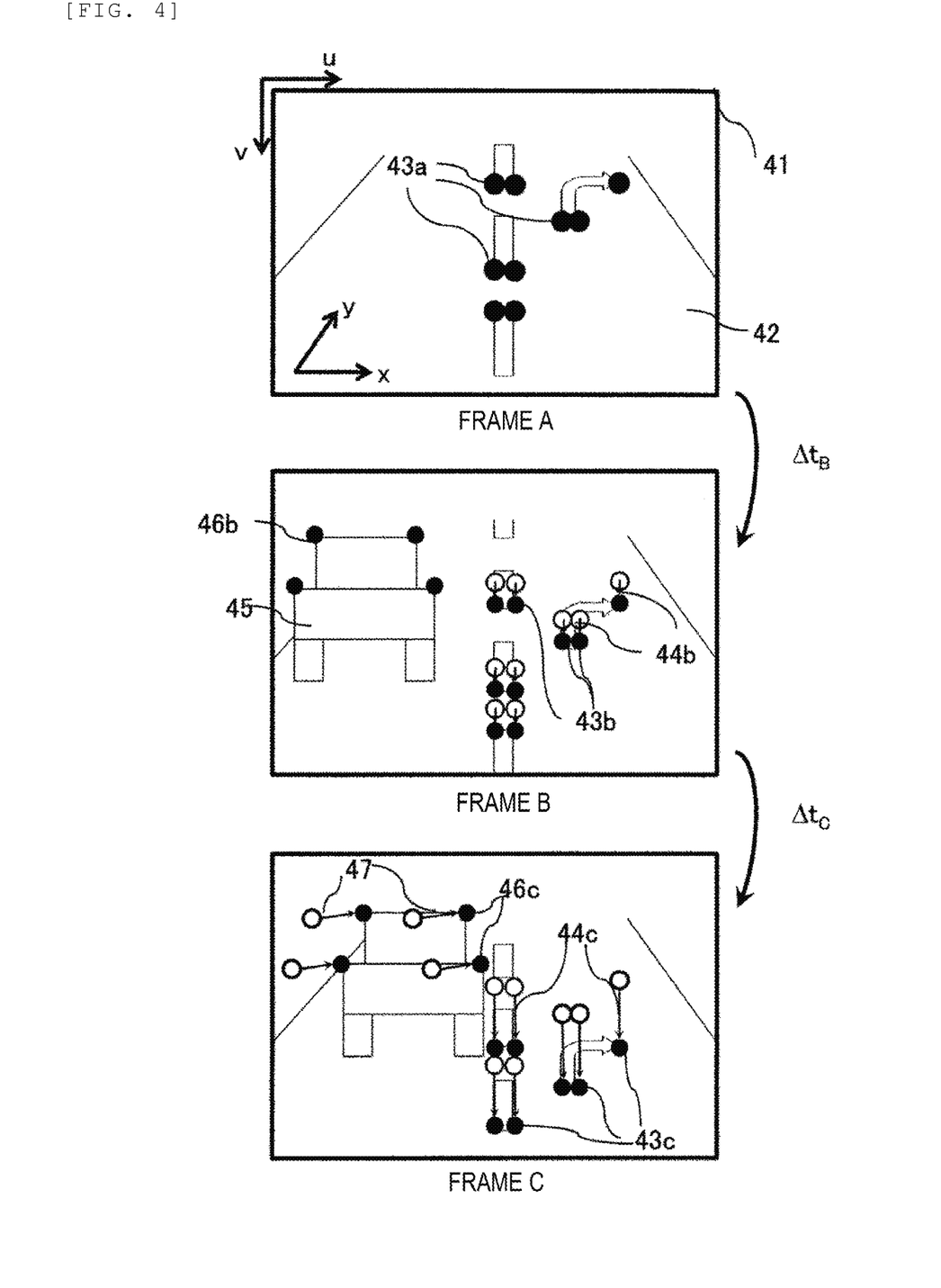
FIG. 4 is an explanatory view of calculation of a movement amount on a road.

FIG. 4 is a view illustrating calculation of a movement amount on a road.

A frame 41 is an image captured by the imaging device 2. (u,v) is the coordinate in pixels on the image and (x,y) is the coordinate in meters of the road of the imaging device 2. Further, a road 42 is the road surface on which the moving object 1 travels.

Feature points 43a are the feature points extracted in Steps 20 to 22 in a frame A. The feature points 43a are subjected to tracking in a frame B, and then the feature points 43a (white circles in a frame B) in the frame A move to the feature points 43b in the frame B. Next, the feature points 43b are subjected to tracking in a frame C, and then the feature points 43b (white circles in the frame C) moves to feature points 43c in the frame C.

A movement amount 44b is a relative movement amount $\Delta d_{Bn}$ (where n is the number of the feature point) calculated in Step 25 based on the positions of the feature points 43a and the feature points 43b and a movement amount 44c is a movement amount $\Delta d_{Cn}$ calculated in Step 25 based on the positions of the feature point 43b and the feature points 43c. In the frame B, when it is assumed that the time between frames is $\Delta t_B$, a relative speed $v_{Bn}=\Delta d_{Bn}/\Delta t_b$ of each feature point 43b is calculated. The relative movement amount $\Delta d_{Bn}$ of the entirety of the feature points is calculated as the relative movement amount of the feature points 43a on the same road surface, and thus there is no huge difference between the plurality of feature points 43a (slightly different as there are turning components). Therefore, the feature point 43b is filtered with a speed filtering condition $|V_e-v_{Bn}|>V_{threshold}$ in Step 26 and, by using the unfiltered $v_{Bn}$, the movement amount $\Delta D_m=\Delta D_B$ and the speed $V_B=\Delta D_B/t_B$ are calculated in Step 27. It is also possible to calculate a direction change $\Delta \theta_B$ from the distribution on the road coordinates of the movement amount $\Delta d_{Cn}$.

A three-dimensional object 45 is a dynamic three-dimensional object appearing in the image of the frame B. A feature point 46b is a feature point of the three-dimensional object 45 in the frame B extracted in Steps 20 to 22. A feature point 46c is a tracked point of the feature point 46b in the frame C in Step 23.

A movement amount 47 is a movement amount from the feature point 46b to the feature point 46c which is calculated in Step 25. The movement amount 44c from the feature point 43b to the feature point 43c and the movement amount 47 from the feature point 46b to the position 46c of the three-dimensional object 45 which are calculated in Steps 20 to 24 are included in the frame C. In Step 25, the time $\Delta t_c$ between frames is used to calculate the relative speed $v_{Cn}$ of each feature point. When the speed $V_B$ of the moving object 1 calculated in the frame B is used as the speed $V_e$ of the speed filtering condition $|V_e-v_{Bn}|>V_{threshold}$, $V_B$ is substituted for $V_e$ and Step 26 is executed. The movement amount 47 from the feature point 46b to the feature point 46c of the three-dimensional object 45 is different from the movement amount 44c from the feature point 43b to the feature point 43c of the road surface, and thus the feature point 46c satisfies the condition $|V_e-v_{Cn}|>V_{threshold}$ in Step 26 and is filtered. Therefore, on the basis of the movement amount 44c from the remaining feature point 43b to the feature point 43c on the road surface, a movement amount $\Delta D_C$ of the moving object 1 can be accurately calculated in Step 27.

When the entirety of the feature points is filtered due to the effect of the three-dimensional object, the approximate value of the movement amount of the moving object 1 is calculated by $\Delta D_m=V_e/\Delta t_m$ using $V_e$ used for speed-filtering in Step 26 and the difference $\Delta t_m$ in an imaging time between frames.

Figure 5A:
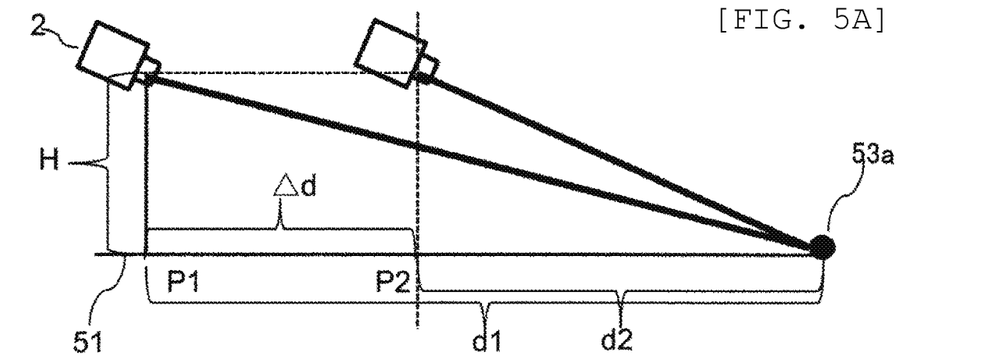
FIGS. 5A to 5C are explanatory views of calculation of a height and a distance of a three-dimensional object.
Figure 5B:
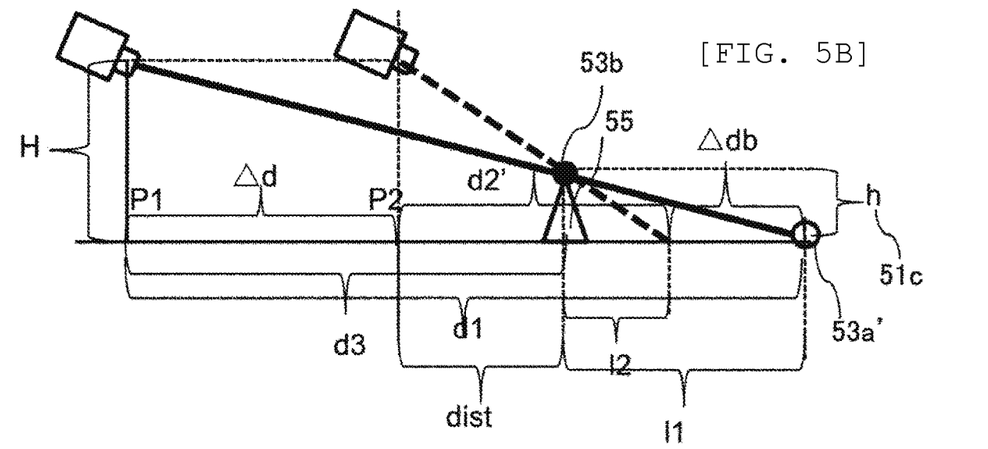
Figure 5C:
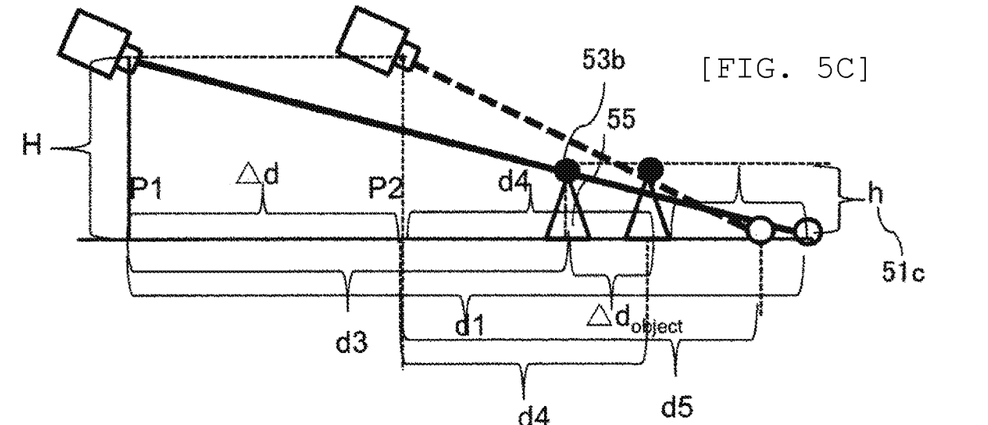

FIG. 5 is a view illustrating the details of Step 29.

First, a case where the imaging device 2 at a height H from a road surface 51 moves from a position P1 to a position P2 and a three-dimensional object is not on the road surface will be described. Steps 20 to 22 are executed at the position P1 and a feature point 53a on the road surface 51 is extracted. When the road surface 51 is flat, the pixel position (u,v) on the image and the actual positional relationship (x,y) become constant, and thus a pixel position $(U,V)_{feature}$ of the feature point 53a on the image can be converted to a position $(X,Y)_{feature}$ of the actual feature point 53a and a distance d1 from the position P1 to the feature point 53a can be calculated. Next, Steps 20 to 27 are executed at the position P2 and a distance d2 from the position P2 to the feature point 53a is calculated, and then the movement amount $\Delta d$ is calculated based on the distances d1 and d2 ($\Delta d=d1-d2$).

Next, a case where a three-dimensional object 55 is located at the position of a height h from the road surface 51 in FIG. 5(B) will be described. When the feature point 53b of the three-dimensional object 55 appears at the pixel position $(U,V)_{feature}$ on the image at the position P1, in the case of feature point 53b, it is converted from the pixel $(U,V)_{feature}$ to an erroneous coordinate 53a' $(X,Y)_{feature}$. Therefore, a distance d3 from the position P1 to the feature point 53b is also calculated with an erroneous value d1. Similarly, when the imaging device 2 moves to the position P2, a distance from the position P2 to the feature point 53b is calculated as an erroneous value d2'. Therefore, in Steps 20 to 27, the movement amount of the moving object 1 is erroneously calculated as $\Delta d'=d1-d2'=\Delta db+\Delta d$. In FIG. 5(B), $\Delta db$ is an error in the movement amount $\Delta d$ caused by tracking the feature point 53b of the three-dimensional object 55. A distance dist is a distance from the position P2 to the three-dimensional object 55, a distance l1 is a distance from the three-dimensional object 55 to the point 53a', and a distance l2 is a difference between the distance d2' and the distance dist. Here, expressions (3) and (4) are obtained from expressions (1) and (2). According to the expressions (3) and (4), a movement amount $\Delta d'$ erroneously calculated when there is the three-dimensional object 55 can be expressed by the installation height H of the camera and the height h of the three-dimensional object 55.

$$h/H = l2/d2' = l1/d1 \quad (1)$$

$$\Delta db = l1 - l2 = h*(d1 - d2')/H \quad (2)$$

$$\Delta d' = \Delta db = \Delta d = d1 - d2'$$
$$= h*(d1 - d2')/H + \Delta d$$
$$= h*\Delta d'/H + \Delta d$$

Therefore, $\Delta d' = \Delta d * H/(H - h)$ (3)

$$h = H*(\Delta d' - \Delta d)/\Delta d' \quad (4)$$

From the above, by substituting the installation height H of the camera, the movement amount $\Delta d'=\Delta db+\Delta d$ which is erroneously calculated when there is the three-dimensional object 55, and the movement amount $\Delta d$ which is correctly calculated when there is no three-dimensional object 55 into the expression (3), the height h of the three-dimensional object can be calculated. The installation height H of the camera is fixed and known. The erroneous movement amount $\Delta d'=\Delta db+\Delta d$ in the case where there is the three-dimensional object 55 can be calculated in Steps 20 to 25 and the correct amount of movement $\Delta d$ in the case where there is no three-dimensional object can be calculated in Step 27 using the feature points which are not filtered in Step 26. When the entirety of the feature points is filtered due to the effect of three-dimensional object, the movement amount of the moving object 1 is calculated with $\Delta d=V_e/\Delta t_m$ using the $V_e$ calculated in Step 26 and the difference $\Delta t_m$ of the imaging time between frames. In Step 29, the movement amount $\Delta d$ and the movement amount $\Delta d'$ are substituted into the expression (4) to calculate the height h of the three-dimensional object 55. When the relative movement amount $\Delta d'=\Delta d_{mn}$ of the feature point is substituted into the expression (4), the height of each feature point can be calculated. However, since it takes time to calculate the heights of the entirety of the feature points, it is only necessary to calculate the height of the feature point filtered in Step 26.

Next, a distance from the position P2 to the three-dimensional object 55 is geometrically calculated by an expression (5). By substituting the calculated distance d2' from the position P2 to the feature point 53b and the calculated height h of the three-dimensional object 55 into the expression (5), the distance dist to each feature point can be calculated.

$$dist=d2'-l2=d2'-d2'*h/H=d2'*(H-h)/H \quad (5)$$

By mounting a GPS and a speed sensor in the moving object 1, the height h and the distance dist of the three-dimensional object 55 can be calculated by combining the information acquired by the GPS or the speed sensor and the information acquired by the imaging device 2. For example, when more accurate movement amount $\Delta d$ is calculated from the GPS, more accurate height h can be calculated by substituting the movement amount $\Delta d$ into the expression (3). Further, by substituting the height h into the expression (5), the distance dist to the three-dimensional object 55 can also be calculated more accurately. When a speed sensor is mounted, the movement amount $\Delta d=V*\Delta t_m$ is calculated using the speed V of the moving object 1 acquired by the speed sensor, and further the height h is calculated from the expression (4) and the distance dist is calculated from expression (5).

FIG. 5(C) illustrates a case where the three-dimensional object 55 is a dynamic three-dimensional object accompanying the movement of the movement amount $\Delta d_{object}$ between frames. In this case, $\Delta d$ is a movement amount of the moving object, d1 is a distance converted value to the three-dimensional object when the moving object is at the point P1, d5 is a distance converted value to the three-dimensional object when the moving object is at the point P2, H is the installation height of the camera, and h is the height of the three-dimensional object. From the relationship in the drawings, an expression (6) is obtained.

$$d_{object}=\Delta d+d4-d3=\Delta d+(d1-d5)*(H-h)/H \quad (6)$$

As described above, $\Delta d$, d1, and d5 are known and, when two or more feature points of the three-dimensional object can be acquired, the movement amount and the height of the three-dimensional object can be calculated from the expression (6) at the same time.

REFERENCE SIGNS LIST

1: moving object
2: imaging device
3: processing device
4: image processing unit
5: control unit
6: memory
7: display unit
8: bus

The invention claimed is:

1. A moving object comprising: an imaging device which captures an image of a road surface; and an image processing unit which calculates a movement amount of the moving object based on an image captured by the imaging device, wherein the image processing unit extracts a plurality of first feature points from a first image captured at a first timing, extracts a plurality of second feature points from a second image captured at a second timing after the first timing, performs tracking on each of the plurality of first feature points to each of the plurality of second feature points, calculates a movement amount and a speed of each of the plurality of second feature points, and calculates a movement amount of the moving object based on a feature point having a speed within a predetermined range among the plurality of second feature points wherein a height of a three-dimensional object on a road surface which is captured by the imaging device is calculated based on a feature point having a speed higher than the predetermined range.

2. The moving object according to claim 1, wherein
a height of a three-dimensional object on a road surface which is captured by the imaging device and/or a distance from the moving object to the three-dimensional object and/or a speed of the three-dimensional object are calculated based on a feature point having a speed higher than the predetermined range among the plurality of second feature points.

3. The moving object according to claim 1, wherein
the speed of the moving object is calculated based on the movement amount and a time when an image is acquired by the imaging device.

4. The moving object according to claim 2, wherein
the speed of the moving object is calculated based on the movement amount and a time when an image is acquired by the imaging device.

\* \* \* \* \*